United States Patent
Nagashima et al.

(12) 
(10) Patent No.: US 6,180,177 B1
(45) Date of Patent: Jan. 30, 2001

(54) SURFACE TREATMENT COMPOSITION FOR METALLIC MATERIAL AND METHOD FOR TREATMENT

(75) Inventors: Yasuhiko Nagashima; Hiroki Hayashi, both of Tokyo (JP)

(73) Assignee: Nihon Parkerizing Co., Ltd., Tokyo (JP)

(*) Notice: Under 35 U.S.C. 154(b), the term of this patent shall be extended for 0 days.

(21) Appl. No.: 09/319,720

(22) PCT Filed: Oct. 2, 1998

(86) PCT No.: PCT/JP98/04458

§ 371 Date: Jun. 10, 1999

§ 102(e) Date: Jun. 10, 1999

(87) PCT Pub. No.: WO99/18256

PCT Pub. Date: Apr. 15, 1999

(30) Foreign Application Priority Data

Oct. 3, 1997 (JP) .................................................... 9-287763

(51) Int. Cl.[7] ................................. B05D 3/02; B05D 7/14
(52) U.S. Cl. ........................... 427/388.4; 524/1; 524/284
(58) Field of Search .............................. 427/388.4; 524/1, 524/284

(56) References Cited

U.S. PATENT DOCUMENTS

| 5,242,714 | * | 9/1993 | Steele et al. .......................... 427/379 |
| 5,370,909 | | 12/1994 | Tanaka et al. . |
| 5,733,386 | | 3/1998 | Yoshida et al. . |

FOREIGN PATENT DOCUMENTS

| 4-66671 | | 3/1992 | (JP) . |
| 7-278410 | | 10/1995 | (JP) . |
| 9-31404 | | 2/1997 | (JP) . |
| 9-031403 | * | 2/1997 | (JP) . |
| 9-111466 | | 4/1997 | (JP) . |
| WO 97/13887 | | 4/1997 | (JP) . |
| 9-241576 | | 9/1997 | (JP) . |
| WO 97/04145 | | 2/1997 | (WO) . |

* cited by examiner

Primary Examiner—Erma Cameron
(74) Attorney, Agent, or Firm—Armstrong, Westerman, Hattori, McLeland & Naughton

(57) ABSTRACT

In the composition of the surface-treatment agent used for metallic material, a composition having such high corrosion-resistance as to replace the chromate coating is provided. In the composition of the surface-treatment agent provided for the metallic material, fingerprint resistance, blackening resistance and adhesiveness of paint coating are also improved. The metallic material is treated by an acidic surface-treating agent comprising the following components:

(A) a cationic component, which consists of divalent or higher valent metallic ions selected from the group consisting of manganese, cobalt, zinc, magnesium, nickel, iron, titanium, aluminum and zirconium;

(B) at least one acid component selected from the group consisting of (1) fluoro-acid which contains four or more fluorine atoms, and one or more elements selected from the group consisting of titanium, zirconium, silicon, hafnium, aluminum and boron, (2) phosphoric acid, and (3) acetic acid;

(C) a silane coupling-agent component which consists of one or more compounds which contain at least one reactive functional group selected from an amino group containing active hydrogen, an epoxy group, a vinyl group, a mercapto group and a methacryloxy group;

(D) one or more water-soluble polymer components which are expressed by the following general formula (I) and has a polymerization degree of from 2 to 50 of the polymeric unit.

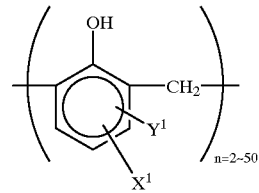

(I)

8 Claims, No Drawings

SURFACE TREATMENT COMPOSITION FOR METALLIC MATERIAL AND METHOD FOR TREATMENT

The present application is a national stage under 35 U.S.C. §371 of international application PCT/JP98/04458 filed on Oct. 2, 1998.

TECHNICAL FIELD

The present invention relates to the composition of a surface-treatment agent and the treating method, which can impart to the surface of metallic materials a high corrosion-resistance and can form a film having improved fingerprint resistance, blackening resistance and adhesiveness of the paint coating.

BACKGROUND TECHNIQUE

Such metallic materials as steel sheets plated with a zinc-containing metal, aluminum sheets and the like are used in broad fields such as automobiles, building materials and appliances. However, the zinc and aluminum used in these metallic materials are corroded in ambient air to form a corrosion product which is the so-called white rust. This corrosion product disadvantageously impairs the appearance of metallic materials and further detrimentally effects the adhesiveness of the paint coating.

Therefore, in order to improve corrosion-resistance and adhesiveness of paint coating, chromating is usually applied on the surface of metallic materials by using a treating agent which contains as the main components chromic acid, bichromic acid or its salts.

Nevertheless, chromating is liable to often avoided because consciousness of environmental conservation is recently intensified. The hexavalent chromium contained in the chromating liquid used for treating the surface of metallic materials exerts detrimental influence directly upon the human body. In addition, the waste water, which contains hexavalent chromium, must be subjected to special treatment as stipulated under the Law of Prevention of Water Pollution. This is a reason that the total cost of the surface-treated metallic materials is considerably increased. In addition, when the equipment, in which the chromated metallic material is used, is discarded, the metallic material becomes industrial waste which, however, contains chromium. Although these materials are chromium-source, a serious disadvantage is that they cannot be recycled. This involves a socially serious problem.

Meanwhile, a well-known surface treating method other than chromating is that using a surface-treating agent which contains tannic acid which, in turn, contains polyphenol carboxylic acid. When the metallic material is treated with an aqueous solution of tannic acid, a protective film is formed by the reaction between the tannic acid and the metallic material. It is believed that since the protective film acts as a barrier against intrusion of corrosive material, the corrosion-resistance is enhanced.

However, since, recently, high corrosion-resistance of the film per se is required along with quality enhancement of the products, the corrosion-resistance attained by the tannic acid alone or the tannic acid together with an inorganic component falls short. It is not possible for such film, therefore, to be put to practical use under the present situation.

There is a disclosure in Japanese Unexamined Patent Publication (kokai) No. Sho 53-121034 to enhance the corrosion resistance, that is, an aqueous solution, which contains water dispersive silica, alkyd resin and trialkoxy silane compound, is applied on the metal surface and dried to form the coating film.

There are disclosure in Japanese Unexamined Patent Publications (kokai) Nos. Sho 57-44,751 and Hei 1-177,380 of a surface treatment method, in which a water-soluble resin consisting of a hydroxypyrone-compound derivative is used to impart to the metallic material the corrosion-resistance, and a method, in which a water-soluble or water-dispersive polymer of a hydroxystyrene compound is used to impart to the metallic material the corrosion resistance.

However, none of the above-described methods can form a film which has sufficiently high corrosion-resistance capable of substituting for the chromate film. The practical issue is, therefore, that the above-described problems have remain unsolved. Accordingly, it is strongly required under the present situation that the non-chromate surface-treatment agent and the treatment method be developed for the metallic material to improve corrosion-resistance.

It is an object of the present invention to solve the above described problems involved in the prior art, and to provide a non-chromate type surface-treatment agent for metallic materials, which agent can form on the surface of metallic material a film having improved corrosion-resistance, and which agent can improve fingerprint resistance, blackening resistance and adhesiveness of the paint coating. It is also an object of the present invention to provide a surface-treating method using the non-chromate type surface-treatment agent.

DISCLOSURE OF INVENTION

The present inventors repeatedly undertook intensive study to solve the problems involved in the prior art and discovered that a film, which exhibits improved corrosion-resistance, fingerprint resistance, blackening resistance and adhesiveness of the paint coating can be formed by means of treating the surface of metallic material with an acidic treating agent which contains a specific cationic component, a silane coupling agent and a water-soluble polymer having a specific chemical structure. The present invention was thus completed.

Namely, the composition of surface-treatment agent used for the metallic material is characterized by containing an aqueous medium and the following components dissolved in the aqueous medium.

(A) A cationic component, which consists of divalent or higher valent metallic ions selected from the group consisting of manganese, cobalt, zinc, magnesium, nickel, iron, titanium, aluminum and zirconium.

(B) At least one acid component selected from the group consisting of (1) fluoro-acid which contains four or more fluorine atoms, and one or more elements selected from the group consisting of titanium, zirconium, silicon, hafnium, aluminum and boron, (2) phosphoric acid, and (3) acetic acid.

(C) A silane coupling agent component which consists of at least one compound which contains at least one reactive functional group selected from an amino group containing active hydrogen, an epoxy group, a vinyl group, a mercapto group and methacryloxy group.

(D) At least one water-soluble polymer component, the polymerization unit of which is expressed by the following general formula (I) and has from 2 to 50 of the average polymerization degree n.

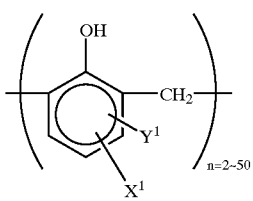
(I)

In the formula (I), $X^1$ bonded to the benzene ring expresses a hydrogen atom, a hydroxyl group, an alkyl group of $C_1$ to $C_5$, a hydroxylalkyl group of $C_1$ to $C_{10}$, an aryl group of $C_6$ to $C_{12}$, a benzyl group, a benzal group, an unsaturated hydrocarbon group (formula II) which condenses with said benzene ring to form a naphthalane ring, or formula (III) mentioned below,

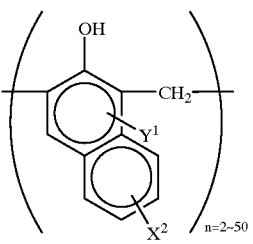
(II)

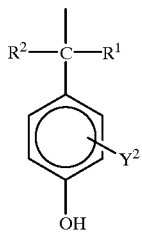
(III)

In the formula (II) $X^2$ bonded to the benzene ring expresses a hydrogen atom, a hydroxyl group, an alkyl group of $C_1$ to $C_5$, a hydroxyalkyl group of $C_1$ to $C_{10}$, an aryl group of $C_6$ to $C_{12}$, a benzyl group and a benzal group, $R^1$ and $R^2$ in the formula (III) express, each or independently from one another, a hydrogen atom, a hydroxyl group, an alkyl group of $C_1$ to $C_5$ or a hydroxyalkyl group of $C_1$ to $C_{10}$, and $Y^1$ and $Y^2$ in the formula (I), (II) and (III) bonded to the benzene ring express each or independently from one another a Z group expressed by the following formula (IV) and (V):

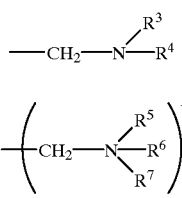
(IV)

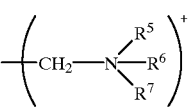
(V)

in said formula (IV) and (V), $R^3$, $R^4$, $R^5$, $R^6$ and $R^7$ express, each or independently from one another, a hydrogen atom, an alkyl group of $C_1$ to $C_5$ or a hydroxyalkyl group of $C_1$ to $C_{10}$, each of $X^1$, and $Y^2$ coupled to a benzene ring of said polymerization units may be the same as or different from the $X^1$, $Y^1$ and $Y^2$ coupled to the other benzene rings, and the average substitution value of said Z group in each benzene ring of said polymer molecules is from 0.2 to 1.0 in average.

Preferably, the composition of surface-treatment agent according to the present invention contains from 0.01 to 10% by weight of the cationic component based on the solid matter thereof.

Preferably, the composition of the surface-treatment agent according to the present invention contains from 0.1 to 15% by weight of the acid component (B) consisting of (1) fluoroacid, (2) phosphoric acid and/or (3) acetic acid based on the total solid matters thereof.

Preferably, the weight ratio of the silane coupling-agent component (C)/ water-soluble polymer component (D) is from 1/10 to 10/1.

BEST MODE FOR CARRYING OUT INVENTION

The surface-treatment method according to the present invention is also characterized in that the aqueous treating liquid, which contains the composition of the surface-treatment agent used for the metallic material according to the present invention and the pH of which is adjusted in a range of from 2.0 to 6.5, is deposited on the surface of metallic material and is dried to form a film having from 0.01 to 5.0 $g/m^2$ of dry weight.

In the composition of surface treatment-agent according to the present invention, the silane coupling-agent preferably contains (a) the first silane component having one or more active hydrogen-containing amino groups and (b) the second silane coupling-agent which consists of one or more compounds having one or more epoxy groups. Preferably, the equivalent ratio of the active hydrogen-containing groups of said first group silane coupling-agent (a) relative to the epoxy group contained in the second silane coupling-agent (b) is from 3:1 to 1:3. Preferably, the weight ratio of the total of the first silane coupling-agent (a) plus the second silane coupling-agent (b) relative to the water-soluble polymer component (D), i.e., [(a)+(b)]/(D) is from 5/1 to 1/5.

The composition of the surface-treatment agent used for the metallic material according to the present invention is an acid aqueous solution, in which the cationic component comprising the specified divalent or higher valent metals, a silane coupling agent component consisting of one or more compounds having a specified reactive functional group, and a water-soluble polymer component consisting of at least one phenol-resin based polymer containing a special amino group are dissolved in the aqueous medium.

The cationic component (A) used in the present invention and consisting of the divalent or higher valent metal ions contains at least one metal selected from manganese, cobalt, zinc, magnesium, nickel, iron, titanium, aluminum and zirconium. As long as these metals are contained, the method of supplying them is not particularly limited. Specific preferable examples of the supplying method is the addition in the form of carbonate, phosphate, nitrate, sulfate, acetate, fluoride salt, oxide salt or metal. Metallic ions other than the above-mentioned ones are not preferable because high corrosion-resistance is not obtained.

The concentration of the cationic component is preferably from 0.01 to 10% by weight relative to the total solid matters of the composition of the surface-treatment agent according to the present invention. When this content is less than 0.01% by weight, the film depositing characteristics are not yet so satisfactory such that the corrosion-resistance may be impaired. On the other hand, when the cationic component exceeds 10% by weight, the stability of the composition of the surface-treatment agent and the aqueous treating liquid containing such composition is impaired.

The acid component (B) in the surface-treatment composition in the present invention contains at least one selected from the group consisting of (1) fluoro-acid which contains at least four fluorine atoms, and one or more elements selected from the group consisting of titanium, zirconium, silicon, hafnium, aluminum and boron, (2) phosphoric acid, and (3) acetic acid. The blending amount of these components is not particularly limited. It is, however, preferable that the pH of the composition of the surface-treatment is adjusted to 2.0 to 6.5 by that acid component. In addition, the acid component is preferably contained at 0.1 to 15% by weight relative to the total solid matters of the composition of the surface-treatment agent according to the present invention. When the acid component is less than 0.1% by weight relative to the total solid matters, the pH cannot be adjusted within the above mentioned range, with the result that the film-depositing characteristic is impaired and the corrosion-resistance is degraded. In addition, when the weight percentage of the acid component relative to the total solid matters exceed 15% by weight, the stability of the composition of the surface-treatment agent and the aqueous treating liquid may be impaired.

The silane coupling-agent component (C) used in the present invention may have any non-limited structure, provided that it contains as the reactive functional group at least one selected from an amino group containing active hydrogen, an epoxy group, a vinyl group, a mercapto group and a methacryloxy group. As specific examples the following compositions (1)–(5) can be listed and can be used.

(1) One having an amino group
    N-(2-aminoethyl) 3-aminopropyl methyldimethoxysilane, N-(aminoethyl) 3-aminopropyl trimethoxysilane, and 3-aminopropyltriethoxysilane
(2) One having an epoxy group
    3-glycidoxypropyl trimethoxisilane, 3-glycidoxypropyl methyldimethoxysilane, and 2-(3,4 epoxycyclohexyl) ethyl trimethoxysilane
(3) One having a vinyl group
    Vinyltriethoxysilane
(4) One having a mercapto group
    3-mercaptopropyl trimethoxisilane
(5) One having a methacryloxy group
    3-methacryloxypropyl trimethoxysilane and 3-methacryloxypropyl-methyldimethoxysilane The silane coupling-agent component (C) used in the present invention preferably consists of (a) a silane coupling-agent consisting of at least one compound having an active-hydrogen containing an amino group and (b) a silane coupling-agent consisting of at least one compound having one or more epoxy groups.

In a case, where the first and second silane coupling agents are used in the surface-treatment agent of the present invention, and hence the reactive functional groups of the silane coupling-agents are an amino group having active hydrogen and an epoxy group, the equivalent ratio of the amino group having active hydrogen to the epoxy group is preferably in a range of 3:1 to 1:3. When the equivalent ratio of the amino group having active hydrogen to the epoxy group exceeds 3:1 and hence the amount of the amino group is excessive, the film-depositing property of the film obtained by treatment is of so poor that corrosion-resistance, fingerprint resistance, blackening resistance and adhesiveness of the paint coating are not satisfactory. In addition, when this equivalent ratio is less than 1:3, corrosion-resistance, fingerprint resistance, blackening resistance and adhesiveness of the paint coating on the film obtained by the treatment are saturated and hence such film is economically useless.

The water-soluble polymer (D) used in the present invention is an oligomer or polymer which contains the polymer expressed by the above-mentioned (I) and (II). The average polymerization degree of the polymeric unit of the formula (I) and (II) is from 2 to 50.

In the formula (I), $X^1$ bonded to the benzene ring expresses the hydrogen atom; the hydroxyl group; the alkyl group of $C_1$ to $C_5$, e.g., methyl, ethyl, propyl groups and the like; the hydroxyalkyl group of $C_1$ to $C_{10}$, e.g., hydroxymethyl, hydroxyethyl, hydroxypropyl groups and the like; the aryl group of $C_6$ to $C_{12}$, e.g., phenyl, naphthyl groups and the like; the benzyl group; the benzal group; unsaturated hydrocarbon group (formula II), which condenses with said benzene ring to form a naphthalane ring, i.e., —CH=CH—CH=CH— or =CH—CH=CH— CH= group or the above formula (III). In the formula (I)I, $X^2$ bonded to the benzene ring expresses the hydrogen atom; hydroxyl group; the alkyl group of $C_1$ to $C_5$, the hydroxyalkyl group of $C_1$ to $C_{10}$, the aryl group of $C_6$ to $C_{12}$, the benzyl group and the benzal group.

In the formula (III), $R^1$ and $R^2$ express: each or independently from one another, the hydrogen atom; the hydroxyl group; the alkyl group of $C_1$ to $C_{10}$, e.g., methyl, ethyl, propyl groups and the like; or hydroxyalkyl group of $C_1$ to $C_{10}$, e.g., hydroxymethyl, hydroxyethyl, hydroxypropyl groups or the like.

$Y^1$ and $Y^2$ bonded to the benzene ring in (I), (II) and (III) has: each or independently from one another, the hydrogen atom or the Z group expressed by the formula (IV) or (V). In addition, $R^3$, $R^4$, $R^5$, $R^6$ and $R^7$ in the formula (IV) or (V) express: each or independently from one another, the alkyl group of $C_1$ to $C_{10}$, e.g., methyl, ethyl, propyl groups and the like, and the hydroxyalkyl group of $C_1$ to $C_{10}$, e.g., hydroxymethyl, hydroxyethyl, hydroxypropyl groups and the like.

$X^1$ and $Y^1$ (in formula (I)), $X^2$ and $Y^1$ (in formula (II)), and $Y^2$ (in formula (III)) coupled to each benzene ring of the above-mentioned polymer molecules may each be the same as or different from the $X^1$, $Y^1$ and $Y^2$ coupled to the other benzene rings. In addition, the average substitution value of said Z group in each benzene ring of said polymer molecules is from 0.2 to 1.0 in average. In the formula (I) and (II) n indicates the average polymerization degree of from 2 to 50. When n is less than 2, the molecular weight of the obtained polymer is too small to attain corrosion-resistance of the obtained film. In addition, when n exceeds 50, the stability of the obtained composition of the surface-treatment agent as well as the water-soluble treating liquid, which contains said composition, is poor, thus causing practical inconvenience.

The average Z-group substitution value is the average of the Z groups introduced in each of all the benzene rings of the polymer molecules. For example, when n=10 in the formula (I) and further $X^1$ is the benzene-containing group of the formula (III), then the number of benzene introduced per one molecule of the polymer is 20. When one Z group is introduced in the ten benzene rings per one polymer molecule, the average value of the Z-group substitution in the polymer is [(1×10)+(0×10)]/20=0.5. When the average Z-group substitution value is less than 0.2, the water-soluble property of the obtained polymer is unsatisfactory and, hence the stability of the composition of the surface-treatment agent and the aqueous treating liquid obtained from that composition is poor. On the other hand, when such value exceeds 1.0, the water-soluble property of the obtained polymer becomes excessive so that the soluble property of the obtained film is increased such that the corrosion-resistance becomes unsatisfactory.

$R^3$–$R^7$ in the Z group, which is expressed by the formula (IV) and (V), each express the alkyl group of $C_1$ to $C_5$ and the hydroxyalkyl group of $C_1$ to $C_{10}$. When the carbon number of these groups is 11 or more, the film-depositing property is so low that the corrosion-resistance of the obtained coating becomes unsatisfactory.

In the surface-treating agent of the present invention, the weight ratio of the silane coupling agent (C) to the water-soluble polymer (D) is preferably from 1:10 to 10:1, more preferably from 1:1 to 5:1. When this ratio is less than 1:10, that is, the ratio of silane coupling-agent is low, since the strength of adhesion on the substrate surface is lowered, the corrosion-resistance and the adhesiveness are lowered. When that ratio exceeds 10:1, that is, the ratio of contained silane coupling agent becomes excessive, the film-depositing speed of the obtained surface-treatment composition is lowered and hence the corrosion-resistance becomes unsatisfactory.

Preferably, the pH of the aqueous surface treating liquid, which contains the composition of the surface-treatment agent according to the present invention, is adjusted in a range of from 2.0 to 6.5. In a case of raising the pH of the aqueous surface-treating liquid, it is preferable to use as the adjusting agent ammonium water, hydroxide salt and the like. In a case of lowering the pH of the aqueous surface-treating liquid, it is preferable to use as the adjusting agent the acid component (B) used in the present invention. When the pH is less than 2.0, the reaction of the substrate surface becomes excessive so that failure in the film formation is incurred. As a result, corrosion-resistance, fingerprint resistance, blackening resistance and adhesiveness of paint coating become unsatisfactory. In addition, when the pH exceeds 6.5, the water-soluble polymer per se is liable to precipitate and deposit from the aqueous treating liquid. The life of the aqueous surface-treating liquid is, therefore, shortened.

It is also preferable in the method according to the present invention to deposit on the surface of metallic material the aqueous surface-treating liquid and dry it to provide from 0.01 to 5.0 g/m² of dry weight. When the weight of the film after drying is less than 0.01 g/m², it is difficult to coat the metallic material so that corrosion-resistance, fingerprint resistance, blackening resistance and adhesiveness of the paint coating become unsatisfactory. When the weight of the film after drying exceeds 5.0 g/m², adhesiveness of the paint coating is lowered. The method for depositing the aqueous surface-treating agent is not particularly limited. For example, immersing method, spraying method, roll-coating method and the like can be applied. The treating temperature and time are also not particularly limited. The aqueous surface-treating liquid layer is dried on the surface of the metallic material preferably under heating. The heating temperature is preferably from 50 to 250° C. After heating, water cooling may be carried out, if necessary.

A filler and a lubricant may be blended into the composition of the surface-treatment agent according to the present invention. Zirconia sol, alumina sol, silica sol and the like can used as the filler. Polyethylene wax, polypropylene wax and the like can be used as the lubricant. The above-mentioned filler and lubricant may be preliminarily blended into the composition of the surface-treatment agent according to the present invention.

The metallic material, which is subjected to the surface-treatment according to the present invention, is not particularly limited with regard to kind, dimension, shape and the like. For example, the metallic material can be selected from a steel sheet, a steel sheet plated with the zinc-containing metal, a tin-plated steel sheet, a stainless steel sheet, an aluminum sheet, aluminum alloy sheet and the like.

The metallic material, which is treated by the composition of the surface-treatment agent of the present invention, has greatly improved corrosion-resistance, fingerprint resistance, blackening resistance and adhesiveness of paint coating. Its mode of operation and effects are described.

First, when the surface of the metallic material is brought into contact with the aqueous surface-treating agent, which contains the composition of the surface-treatment agent, the etching of the metal surface occurs due to the acid composition in the treating liquid. This results in a rise of the pH at the interface. The dissolved metallic ions, the divalent or higher valent cationic component in the surface-treating liquid, and the water-soluble polymer are brought into reaction to form on the interface a hard-to-dissolve resin coating. This hard-to-dissolve resin coating seems to exhibit a barrier effect that corrosion-resistance of the metallic material, fingerprint resistance, blackening resistance and adhesiveness of the paint coating are enhanced. However, since the adhesiveness of the metallic material treated as above and the film is low, the silane coupling agent is concomitantly used. The functional group (—OR) of the silane coupling agent, which has undergone hydrolysis, forms an oxane bond with the surface of the metallic material. In addition, the adhesiveness of the metallic material and water-soluble polymer as well as that of the organic paint and water-soluble polymer is enhanced, presumably because the functional group of the silane coupling-agent reacts with the water-soluble polymer and the organic paint.

The present invention is described by way of the following examples which do not limit the scope of the present invention.

The metallic materials, their surface cleaning methods and the aqueous surface-treating liquids used in the following examples and comparative examples are described hereinafter.

1. Tested Materials
   1 Cold-rolled sheets
      Commercially available product: 0.6 mm of sheet thickness. JIS G3141
   2 Steel sheet plated with a zinc-containing metal
      a. commercially available product; 0.6 mm of sheet thickness; electrogalvanized steel sheet on both surfaces (EG material). Depositing amount—20 g/m²
      b. Commercially available product; 0.6 mm of sheet thickness; Immersing galvanized steel (GI material). Depositing amount—40 g/m²
      c. Aluminum sheet (Al material)
         Commercially available product; 0.8 mm of sheet thickness; JIS A5052
2. Cleaning Method of Metallic Sheets
   The surface of the above mentioned metallic materials is subjected to the spraying with the use of an aqueous solution of a medium-alkaline detergent agent (Registered trade mark: Finecleaner 4336, product of Nihon Parkerzing Co., Ltd., agent under the conditions of 60° C. of treating temperature and 20 seconds of treating time, so as to remove the dust and oil adhered on the surface. The alkali matters left on the surface of the tested materials were linsed by city water to clean the surface.

3. Composition of Aqueous Treatment

[Treating Liquid A]

In the water-soluble polymer 1 used, n=5, $X^1$=hydrogen, $Y^1$=Z=—$CH_2N(CH_3)_2$, and the average Z-group substituting value=1. Both the water-soluble polymer 1 and the 3-mercapto-propyl trimethoxysilane were blended to provide 3:1 of the latter weight ratio relative to the water-soluble polymer 1. Zinc ions in the form of zinc acetate were added in an amount corresponding to 1% by weight relative to the amount of total solid matters. Furthermore, zirconium hydrofluoric acid was added as the acid component in an amount of 10% by weight relative to the total solid matters. Phosphoric acid was used to adjust the pH to 3.0. Subsequently, deionized water was used to dilute and to provide 5% by weight of the amount of the total solid matters.

[Treating Liquid B]

In the water-soluble polymer 2 used, n=15, $X^1$=—$C(CH_3)_2$—$C_6H_4$—OH, $Y^1$=Z=—$CH_2N(CH_3)C_2H_5$OH, and the average Z-group substituting value=0.75. Both the water-soluble polymer 2 and the 3-aminopropyl triethoxysilane+3-glycidoxypropylmethyldimethoxysilane (the equivalent ratio of the active hydrogen-containing amino group:the epoxy group=1:3) were blended to provide 1:1 of the latter weight ratio relative to the water-soluble polymer. Titanium ions in the form of titanium fluoroammonium were added in an amount corresponding to 1% by weight relative to the amount of total solid matters. Furthermore, titanium hydrofluoric acid was added as the acid component in an amount of 15% relative to the total solid matters to adjust the pH to 4.0. Subsequently, deionized water was used to dilute and to provide 5% by weight of the amount of the total solid matters.

[Treating Liquid C]

In the water-soluble polymer 3 used, n=5, $X^1$=—$C(CH_3)_2$—$C_6H_4$—OH, $Y^1$=Z=—$CH_2N(CH_3)_2$, and the average Z-group substituting value=0.5. Both the water-soluble polymer 3 and the 3-aminopropyl triethoxysilane+3-glycidoxy-propyl-methyldimethoxysilane (the equivalent ratio of the active hydrogen-containing amino group:the epoxy group=1:1) were blended to provide the latter weight ratio relative to the water-soluble polymer 3 of 5:1. Nickel ions in the form of nickel nitrate were added in an amount corresponding to 1% by weight relative to the amount of total solid matters. Furthermore, silicic hydrofluoric acid was added as the acid component in amount of 0.5% by weight relative to the total solid matters. Acetic acid was used to adjust the pH to 5.0. Subsequently, deionized water was used to dilute and to provide 5% by weight of the amount of the total solid matters.

[Treating Liquid D]

In the water-soluble polymer 4 used, n=3, $X^1$=—$C_4H_3$—OH (naphthalene ring, formula II), $Y^1$=Z=—$CH_2N(CH_3)$$C_2H_5OH$, and the average Z-group substituting value=1.0. Both the water-soluble polymer 4 and the 3-aminopropyl triethoxysilane+3-methacryloxypropyl-trimethoxysilane (the equivalent ratio of the active hydrogen-containing amino group:the methacryloxy group=1:3) were blended to provide 1:4 of the latter weight ratio relative to the water-soluble polymer. Manganese ions in the form of carbonate ions were added in an amount corresponding to 0.5% by weight of the amount of total solid matters. Phosphoric acid was added as the acid component in an amount of 0.2% by weight relative to the total solid matters. Furthermore, titanium hydrofluoric acid was used as the pH adjusting agent to adjust the pH to 2.5. Subsequently, the deionized water was used to dilute and to provide 5% by weight of the total solid matters.

[Treating Liquid E]

In the water-soluble polymer 5 used, n=3, $X^1$=—$C(CH_3)_2$—$C_6H_4$—OH, $Y^1$=Z=—$CH_2N(CH_3)_2$, and the average Z-group substituting value=0.5. Both the water-soluble polymer 5 and 3-aminopropyl trimethoxysilane were blended to provide 4:1 of the latter weight ratio relative to the water-soluble polymer. Zinc ions in the form of zinc acetate were added in an amount corresponding to 2% by weight relative to the total solid matters. Furthermore, acetic acid was added as the acid component in an amount of 1.5% by weight relative to the total solid matters. Zirconium hydrofluoric acid was added as the pH adjusting agent to adjust the pH to 4.0. Subsequently, deionized water was used to dilute and to provide 5% by weight of the amount of the total solid matters.

[Comparative Treating Liquid F]

In the water-soluble polymer 2 used, n=5, $X^1$=—$CH_2$—$C_6H_4$—OH, $Y^1$=Z=—$CH_2N(CH_3)C_2H_5OH$, and the average Z-group substituting value=0.75. Both the water-soluble polymer 2 and the 3-aminopropyl triethoxysilane+3-glycidoxypropylmethyldimethoxysilane (the equivalent ratio of the active hydrogen-containing amino group:the epoxy group=1:1) were blended to provide 1:1 of the latter weight ratio relative to the water-soluble polymer. Titanium ions in the form of titanium fluoro-ammonium were added in an amount corresponding to 1% by weight of the amount of total solid matters. The pH was adjusted by sodium hydroxide to 8.0. Subsequently, deionized water was used to dilute and to provide 5% by weight of the amount of the total solid matters.

[Comparative Treating Liquid G]

In the water-soluble polymer 6 used, n=5, $X^1$=—$CH_2$—$C_6H_4$—OH, $Y^1$=Z=—$CH_2N(CH_3)C_2H_5OH$, and the average Z-group substituting value=0.50. Both the water-soluble polymer 2 and the 3-aminopropyl triethoxysilane+3-glycidoxypropylmethyldimethoxysilane (the equivalent ratio of the active hydrogen-containing amino group:the epoxy group=1:1) were blended to provide 1:1 of the latter weight ratio relative to the water-soluble polymer. Phosphoric acid was added as the acid component in an amount corresponding to 15% by weight relative to the total solid matters to adjust pH to 4.0. Subsequently, deionized water was used to dilute and to provide 5% by weight of the amount of the total solid matters.

[Comparative Treating Liquid H]

In the water-soluble polymer 1 used, n=5, $X^1$=hydrogen, $Y^1$=Z=$CH_2N(CH_3)_2$, and the average Z-group substituting ratio=1. Zinc ions in the form of zinc acetate were added in an amount corresponding to 10% by weight relative to the amount of the total solid matters. Furthermore, acetic acid was added as the acid component in an amount corresponding to 10% by weight relative to the amount of the total solid matters. The pH was adjusted to 3.0 by the acetic acid. Subsequently, deionized water was used to dilute and to provide 5% by weight of the amount of the total solid matters.

[Comparative Treating Liquid]

In the water-soluble polymer 1 used, n=5, $X^1$=hydrogen, $Y^1$=Z=—$CH_2N(CH_3)_2$, and the average Z-group substituting value=1. Both the water-soluble polymer 1 and the 3-aminopropyl triethoxysilane+3-glycidoxypropylmethyldimethoxysilane (the equivalent ratio of the active hydrogen-containing amino group:the epoxy group=1:1) were blended to provide 1:1 of the latter weight ratio relative to the water-soluble polymer. Copper ions in the form of copper acetate were added in an amount corresponding to 1% by weight of the amount of the total solid matters. Furthermore, acetic acid was added as the acid component in an amount corresponding to 10% by weight relative to the amount of total solid matters. The pH was adjusted to 3.0 by the acetic acid. Subsequently, deionized water was used to dilute and to provide 5% by weight of the amount of the total solid matters.

[Comparative Treating Liquid J]

Polyacrylic acid (n=50) was used as the water-soluble polymer 6. Both the water-soluble polymer 11 and the N-(2-aminoethyl)-3-aminopropyl trimethoxysilane were blended to provide 1:4 of the latter weight ratio relative to the water-soluble polymer. Zinc ions in the form of zinc acetate were added in an amount corresponding to 0.5% by weight relative to the amount of the total solid matters. Furthermore, titanium hydro-fluoric acid was added as the acid component in an amount corresponding to 0.7% by weight relative to the amount of total solid matters. The pH was adjusted to 4.0 by the phosphoric acid. Subsequently, the deionized water was used to dilute and to provide 5% by weight of the amount of the total solid matters.

EXAMPLE 1

The aqueous treating agent A was applied, by a roll-coating method, on the cold-rolled steel sheet material which was cleaned by the above-described method. Heating and drying was carried out in such a manner to attain the the arrival-sheet-temperature of 150° C.

EXAMPLE 2

The aqueous treating agent B was applied, by a roll-coating method, on the cold-rolled steel sheet material which was cleaned by the above-described method. Heating and drying was carried out in such a manner to attain the arrival sheet-temperature of 100° C.

EXAMPLE 3

The aqueous treating agent B was applied, by a roll-coating method, on the electrogalvanized steel sheet which has been cleaned by the above-described cleaning method. Heating and drying was carried out in such a manner that the arrival sheet-temperature of 100° C.

EXAMPLE 4

The aqueous treating agent C was applied, by a roll-coating method, on the hot-dip galvanized steel sheet which was cleaned by the above-described cleaning method. Heating and drying was carried out in such a manner to attain the arrival sheet-temperature of 100° C.

EXAMPLE 5

The aqueous treating agent D was applied, by a roll-coating method, on the hot-dip galvanized steel sheet which was cleaned by the above-described cleaning method. Heating and drying was carried out in such a manner to attain the arrival sheet-temperature of 80° C.

EXAMPLE 6

The aqueous treating agent E was applied, by a roll-coating method, on the hot-dip galvanized steel sheet which was cleaned by the above-described cleaning method. Heating and drying was carried out in such a manner to attain the arival sheet-temperature of 200° C., immediately followed by dipping in water for cooling.

EXAMPLE 7

The aqueous treating agent B was applied, by a roll-coating method, on the aluminum sheet material, which was cleaned by the above described cleaning method. Heating and drying was carried out in such a manner to attain the arrival sheet-temperature of 200° C.

EXAMPLE 8

The aqueous treating agent C was applied, by a roll-coating method, on the aluminum sheet material, which was cleaned by the above-described cleaning method. Heating and drying was carried out in such a manner to attain the arrival sheet-temperature of 100° C.

Comparative Example 1

The aqueous treating agent F was applied, by a roll-coating method, on the cold-rolled steel sheet material, which was cleaned by the above-described cleaning method. Heating and drying was carried out in such a manner to attain the arrival sheet-temperature of 100° C.

Comparative Example 2

The aqueous treating agent G was applied, by a roll-coating method, on the electrogalvanized steel sheet material, which was cleaned by the above-described cleaning method. Heating and drying was carried out in such a manner to attain the arrival sheet-temperature of 100° C.

Comparative Example 3

The aqueous treating agent H was applied, by a roll-coating method, on the electrogalvanized steel sheet material, which was cleaned by the above described cleaning method. Heating and drying was carried out in such a manner to attain the arrival sheet-temperature of 150° C.

Comparative Example 4

The aqueous treating agent H was applied, by a roll-coating method, on the electrogalvanized steel sheet material, which was cleaned by the above mentioned cleaning method. Heating and drying was carried out in such a manner to attain the arrival sheet-temperature of 80° C.

Comparative Example 5

The aqueous treating agent H was applied, by a roll-coating method, on the electrogalvanized steel sheet material, which was cleaned by the above-described cleaning method. Heating and drying was carried out in such a manner to attain the arrival sheet-temperature of 100° C.

For example, the surface-treatment agent compositions and the compositions of the treating liquids of Examples 1–8 and Comparative Examples 1–5 are shown in Table 1.

3. Evaluation Test Methods

The performances of the surface-treated metallic materials obtained by the above mentioned examples and comparative examples were evaluated by the methods described below.

3.1. Corrosion Resistance
  a) Corrosion Resistance ①
    In the cases where the tested materials are the steel sheets plated with zinc-containing metal (EG, GI) and aluminum sheet (Al), the white-rust resistance was measured with the naked eye by the salt-spraying test (JIS Z 2371). The time until the white rust formed amounted to 5% of area was utilized for the evaluation.
  b) Corrosion Resistance ②
    In the cases where the tested material is the cold-rolled steel sheet, the testing conditions were 50° C. of temperature and 95% of relative humidity. The time until the rust formed amounted to 5% of the area was utilized for the evaluation.

3.2. Adhesiveness of the Paint Coating
  The paint was applied on the tested and surface-treated metallic material under the following conditions, and the adhesiveness test of the paint coating was carried out.

[Paint coating conditions]

The alkyd paint (Trade name of Dainihon Paint Co., Ltd.—Dericon #700) coating: bar-coating method; baking condition—140° C. for 20 minutes; 25 μm-thick paint coating formed.

3.2.1. Primary Adhesiveness

①  Cross Cut Test

One hundreds cross cuts 1 mm square were made by an NT cutter on the paint coating to reach the steel material. The paint coating was then peeled off with a cellophane tape. The evaluation was carried out by the residual number of the paint-coating squares.

② Cross cut Erichsen Test

One hundreds cross cuts 1 mm square were made by an NT cutter on the paint coating to reach the steel material. Extrusion by 5 mm was carried out by an Erichsen tester. The peeling with a cellophane tape was then carried out on the extruded convex portion. The residual number of the paint-coating squares was utilized for the evaluation.

3.2.2. Secondary Adhesiveness

The paint-coated sheets were immersed for two hours in boiling pure water. The same evaluation as in the primary adhesiveness was then carried out.

3.2.3. Fingerprint resistance

A finger was pressed on the tested materials, and the condition of the fingerprint mark was evaluated by the naked eye. The evaluation results were as follows.

⊚: No fingerprint mark is left at all.
○: The fingerprint mark left is extremely slight.
Δ: The fingerprint mark left is left slight.
X: The fingerprint mark is clearly left.

3.2.4. Blackening Resistance

A plurality of sheet sections were cut from a tested sheet. A pair of sheet sections were placed face-to-face. From five to ten pairs were stacked and then packed with vinyl coating paper. The four corners of the stack were fastened by bolts, and 0.67 kgf.cm of load was applied to the bolts by means of a torque wrench. The stacks were then held for 240 hours at 70° C. in a wet box having 80% of relative humidity. After withdrawal from the wet box, the blackening condition of the stacked portions was judged by the naked eye under the following criteria.

5: No blackening
4: Extremely slight graying
3: Less than 25% of blackening
2: From 25% to less than 50% of blackening
1: 50% or more of blackening The results of the above mentioned test and evaluation are shown in Table 1.

As is clear from the results of Table 1, improved corrosion resistance and adhesiveness of the paint coating are exhibited in Examples 1–8, in which the aqueous surface-treating liquid-containing the surface-treatment agent composition according to the present invention is used. However, corrosion-resistance, fingerprint resistance and blackening resistance were considerably poor in Comparative Example 1, in which the pH of the aqueous treating liquid was outside the inventive range; in Comparative Example 2, in which a divalent or higher valent metal is not contained in the aqueous treating agent used; in Comparative Example 3 without the silane coupling agent; in Comparative Example 4, in which copper ions outside the present inventive scope were used; and in Comparative Example 5 in which the water-soluble polymer used was outside the present inventive scope. In addition, in Comparative Example 3 without the silane coupling agent, the adhesiveness of the paint coating was poor.

TABLE 1

| | | | | | Silane Coupling-Agent Component (A) | |
|---|---|---|---|---|---|---|
| | Number | material | Treating Agent | Added Metal | Functional Group of Silane Coupling Agent | Blending Male Ratio |
| Examples | 1 | SPC | A | Zinc | mercapto group | — |
| | 2 | PSC | B | Titanium | amino group + epoxy group | 1:3 |
| | 3 | EG | B | Titanium | amino group + epoxy group | 1:3 |
| | 4 | GI | C | Nickel | amino group + epoxy group | 1:1 |
| | 5 | EG | D | Manganese | amino group + methacryloxy group | 1:1 |
| | 6 | EG | E | Zinc | amino group | — |
| | 7 | Al | B | Titanium | amino group + epoxy group | 1:1 |
| | 8 | Al | C | Nickel | amino group + epoxy group | 3:1 |
| Comparative Examples | 1 | SPC | F | Titanium | amino group + epoxy group | 1:1 |
| | 2 | SPC | G | — | amino group + epoxy group | 1:1 |
| | 3 | EG | H | Zinc | — | — |
| | 4 | EG | I | Copper | amino group + epoxy group | 1:1 |
| | 5 | EG | J | Zinc | amino grup | — |

| | | Water-Soluble Polymer Component (B) | | | | |
|---|---|---|---|---|---|---|
| | Number | n | X | Y | Average Z-group substituting Value | pH of Aqueous Treating Liquid | Acid Component |
| Examples | 1 | 5 | hydrogen | —$CH_2N(CH_3)_2$ | 1.00 | 3.0 | zirconium hydrofluoric acid |
| | 2 | 15 | —$C(CH_3)_2$—$C_6H_4$—OH | —$CH_2N(CH_3)C_2H_5OH$ | 0.75 | 4.0 | titanium hydrofluoric acid |

TABLE 1-continued

|  | | | | | | | |
|---|---|---|---|---|---|---|---|
| | 3 | 15 | —C(CH$_3$)$_2$—C$_6$H$_4$—OH | —CH$_2$N(CH$_3$)C$_2$H$_5$OH | 0.75 | 4.0 | titanium hydrofluoric acid |
| | 4 | 5 | —C(CH$_3$)$_1$—C$_6$H$_4$—OH | —CH$_2$N(CH$_3$)$_2$ | 0.50 | 0.5 | silicon hydrofluoric acid |
| | 5 | 3 | C$_4$H$_3$—OH | —CH$_2$N(CH$_3$)C$_2$H$_5$OH | 1.00 | 2.5 | Phosphoric acid |
| | 6 | 3 | —C(CH$_3$)$_2$—C$_6$H$_4$—OH | —CH$_2$N(CH$_3$)$_2$ | 0.50 | 4.0 | acetic acid |
| | 7 | 15 | —C(CH$_3$)$_2$—C$_6$H$_4$—OH | —CH$_2$N(CH$_3$)C$_2$H$_5$OH | 0.75 | 4.0 | titanium hydrofluoric acid |
| | 8 | 5 | —C(CH$_3$)$_2$—C$_6$H$_4$—OH | —CH$_2$N(CH$_3$)$_2$ | 0.50 | 5.0 | silicon hydrofluoric acid |
| Comparative Examples | 1 | 15 | —C(CH$_3$)$_2$—C$_6$H$_4$—OH | —CH$_2$N(CH$_3$)C$_2$H$_5$OH | 0.75 | 8.0 | — |
| | 2 | 5 | —C(CH$_3$)$_2$—C$_6$H$_4$—OH | —CH$_2$N(CH$_3$)$_2$ | 0.50 | 4.0 | titanium hydrofluoric acid |
| | 3 | 5 | hydrogen | —CH$_2$N(CH$_3$)$_2$ | 1.00 | 3.0 | acetic acid |
| | 4 | 5 | hydrogen | —CH$_2$N(CH$_3$)$_2$ | 1.00 | 3.0 | acetic acid |
| | 5 | 50 | | polyacrylic acid | | 4.0 | titanium hydrofluoric acid |

TABLE 2

Evaluating and Testing Results

| | No. | Material | Coating amount (g/m$^2$) | Corrosion Resistance ① HCT | Corrosion Resistance ② SST | Adhesiveness of Paint Coating (*1) Primary Adhesiveness Square | Adhesiveness of Paint Coating (*1) Primary Adhesiveness Squares Erichsen | Adhesiveness of Paint Coating (*1) Secondary Adhesiveness Square | Adhesiveness of Paint Coating (*1) Secondary Adhesiveness Squares Erichsen | Fingerprint Resistance | Blackening Resistance |
|---|---|---|---|---|---|---|---|---|---|---|---|
| Examples | 1 | cold rolling | 1.0 | 720 hr | — | 100 | 100 | 100 | 98 | — | — |
| | 2 | cold rolling | 2.0 | 960 hr | — | 100 | 100 | 100 | 100 | — | — |
| | 3 | EG | 0.3 | — | 168 hr | 100 | 100 | 100 | 100 | ◉ | 5 |
| | 4 | GI | 0.1 | — | 144 hr | 100 | 100 | 100 | 100 | ◉ | — |
| | 5 | EG | 0.3 | — | 144 hr | 100 | 100 | 100 | 100 | ○ | 4 |
| | 6 | EG | 1.5 | — | 240 hr | 100 | 100 | 100 | 95 | ◉ | — |
| | 7 | aluminum | 0.3 | — | 360 hr | 100 | 100 | 100 | 100 | ◉ | — |
| | 8 | aluminum | 0.1 | — | 240 hr | 100 | 100 | 100 | 95 | ○ | — |
| Comparative Examples | 1 | cold rolling | 1.0 | 48 hr | — | 100 | 100 | 100 | 98 | — | — |
| | 2 | cold rolling | 2.0 | 48 hr | — | 100 | 100 | 100 | 95 | — | — |
| | 3 | EG | 0.3 | — | 47 hr | 100 | 75 | 100 | 80 | ○ | 3 |
| | 4 | EG | 0.1 | — | 24 hr | 100 | 68 | 100 | 50 | ○ | 2 |
| | 5 | EG | 1.5 | — | 12 hr | 100 | 96 | 100 | 71 | × | 1 |

(*1) residual number of squares

INDUSTRIAL APPLICABILITY

The surface-treatment agent composition and the treating method according to the present invention provide surface treated materials having high corrosion-resistance performance by means of an aqueous treating agent free of chromate. It is, therefore, possible to comply with the restrictions on the use of solvents in the future. Furthermore, the composition of the surface-treatment agent and the treating method according to the present invention involve no limitation as to the kind of metallic materials. It is, therefore, possible to impart to the metallic materials high rust-proof property and adhesiveness of paint coating, while the properties of the metallic materials are kept intact.

In addition, the present invention is extremely useful as a measure for solving social problems and has major practical potential.

What is claimed is:

1. A composition of surface treatment agent used for metallic material, characterized by consisting essentially of the following components dissolved in a water-soluble medium:

(A) a cationic component, which consists of divalent or higher valent metallic ions selected from the group consisting of manganese, cobalt, zinc, magnesium, nickel, iron, titanium, aluminum and zirconium;

(B) at least one acid component selected from the group consisting of (1) fluoro-acid which contains four or more fluorine atoms, and one or more elements selected from the group consisting of titanium, zirconium, silicon, hafnium, aluminum and boron, and (2) acetic acid;

(C) a silane coupling-agent component which consists of one or more compounds which contain at least one reactive functional group selected from an amino group containing active hydrogen, an epoxy group, a vinyl group, a mercapto group and a methacryloxy group;

(D) one or more water-soluble polymer components which are expressed by the following general formula (I) and has a polymerization degree of from 2 to 50 of the polymeric unit,

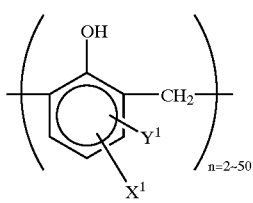
(I)

in the formula (I), $X^1$ bonded to the benzene ring is hydrogen atom, a hydroxyl group, an alkyl group of $C_1$ to $C_5$, a hydroxylalkyl group of $C_1$ to $C_{10}$, aryl group of $C_6$ to $C_{12}$, a benzyl group, a benzal group, an unsaturated hydrocarbon group (formula II) which condenses with said benzene ring to form a naphthalene ring, or formula III; in the formula (II) $X^2$ bonded to the benzene ring is hydrogen atom, a hydroxyl group, an aryl group of $C_6$ to $C_{12}$, a benzyl group and a benzal group,

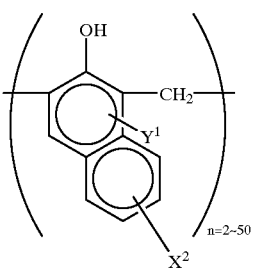
(II)

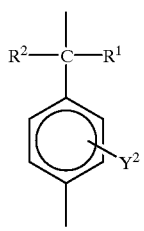
(III)

$R^1$ and $R^2$ in the formula (III) are, each or independently from one another, a hydrogen atom, a hydroxyl group, an alkyl group of $C_1$ to $C_6$ or a hydroxyalkyl group of $C_1$ to $C_{10}$, and $Y^1$ and $Y^2$ bonded to the benzene ring in the formula (I), (II) and (III) are a Z group expressed by the following formula (IV) and (V),

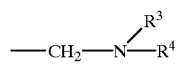
(IV)

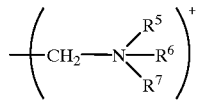
(V)

in said formula (IV) and (V) $R^3$, $R^4$ $R^5$, $R^6$ and $R^7$ are, each or independently from one another, a hydrogen atom, an alkyl group of $C_1$ to $C_5$ or a hydroxyalkyl group of $C_1$ to $C_{10}$, $X^1$, $Y^1$ and $Y^2$ coupled to a benzene ring of said polymerization units may each be the same as or different from the $X^1$, $Y^1$ and $Y^2$ coupled to the other benzene rings, and the value of substitution of said Z group in each benzene ring of said polymer molecules is from 0.2 to 1.0 in average.

2. A composition of the surface-treatment agent used for metallic material according to claim 1, wherein from 0.01 to 10% by weight of said cationic component (A) is contained relative to the total solid matters of the surface-treatment composition.

3. A composition of the surface-treatment agent used for metallic material according to claim 1, wherein from 0.1 to 15% by weight of said acid component (B) is contained relative to the total solid matters of the surface-treatment composition.

4. A composition of the surface-treatment agent used for metallic material according to any one of claims 1 through 3, wherein the weight ratio (C)/(D) of said silane-coupling agent component (C) to said water-soluble polymer component (D) is from 1:10 to 10:1.

5. A composition of the surface-treatment agent used for metallic material according to any one of claims 1 through 3, wherein said silane-coupling agent component (C) comprises (a) the first silane-coupling agent consisting of one or more compounds having an amino group containing one or more active hydrogen atoms, and (b) the second silane-coupling agent consisting of one or more compounds having one or more epoxy groups.

6. A composition of the surface-treatment agent used for metallic material according to claim 5, wherein the equivalent ratio of the active hydrogen-containing amino group contained in said first silane-coupling agent to the epoxy group contained in said second silane-coupling agent is from 3:1 to 1:3.

7. A composition of the surface-treatment agent used for metallic material according to claim 5, wherein the weight ratio [(a)+(b)]/(D) of the total amount of said first silane-coupling agent (a) plus said second silane-coupling agent (b) relative to said water-soluble polymer component (D) is from 5:1 to 1:5.

8. A method for treating metallic material, characterized in that an aqueous treating agent, which contains the composition of the surface-treatment agent according to any one of claims 1 through 3 and, the pH of which is adjusted to 2.0 to 6.5, is deposited on the metallic surface and dried to form a coating having from 0.01 to 5.0 g/m² of dry weight.

* * * * *